(12) United States Patent
Caveney et al.

(10) Patent No.: US 7,526,171 B2
(45) Date of Patent: Apr. 28, 2009

(54) FRONT ACCESS PUNCH DOWN PATCH PANEL

(75) Inventors: Jack E. Caveney, Hinsdale, IL (US); Alan F. Wojcik, Calumet City, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/187,145

(22) Filed: Jul. 22, 2005

(65) Prior Publication Data

US 2006/0018622 A1    Jan. 26, 2006

Related U.S. Application Data

(60) Provisional application No. 60/590,220, filed on Jul. 22, 2004.

(51) Int. Cl.
*G02B 6/00* (2006.01)
(52) U.S. Cl. ..................................... 385/135; 385/134
(58) Field of Classification Search .......... 385/134–137
See application file for complete search history.

(56) References Cited

U.S. PATENT DOCUMENTS

| | | | |
|---|---|---|---|
| 3,831,128 A | 8/1974 | Patuch | |
| 4,898,448 A | 2/1990 | Cooper | |
| 4,900,123 A | 2/1990 | Barlow et al. | |
| 5,071,211 A | 12/1991 | Debortoli et al. | |
| 5,167,001 A | 11/1992 | Debortoli et al. | |
| 5,613,030 A | 3/1997 | Hoffer et al. | |
| 5,639,261 A | 6/1997 | Rutkowski et al. | |
| 5,788,087 A | 8/1998 | Orlando | |
| 5,825,962 A * | 10/1998 | Walters et al. | 385/135 |
| 5,975,962 A * | 11/1999 | Laukonis | 439/713 |
| 6,263,141 B1 | 7/2001 | Smith | |
| 6,301,424 B1 * | 10/2001 | Hwang | 385/135 |
| 6,438,310 B1 * | 8/2002 | Lance et al. | 385/135 |
| 7,259,325 B2 * | 8/2007 | Pincu et al. | 174/50 |
| 2004/0013390 A1 * | 1/2004 | Kim et al. | 385/135 |
| 2004/0120681 A1 * | 6/2004 | Bohle et al. | 385/135 |

* cited by examiner

*Primary Examiner*—Tina M Wong
(74) *Attorney, Agent, or Firm*—Robert A. McCann; Christopher S. Clancy; Aimee E. McVady (57) ABSTRACT

The patch panel assembly includes a drawer and a patch panel pivotally mounted to the drawer. The drawer has a pair of sidewalls and a cable tray positioned therebetween. The cable tray has a plurality of slide locks including lock releases that allow the cable tray to move between a closed position and an open position with respect to the sidewalls. The cable tray also has a plurality of retainer clips that allow the patch panel to move between an upright position and a rotated position with respect to the cable tray.

19 Claims, 13 Drawing Sheets

FRONT ACCESS PUNCH DOWN PATCH PANEL

CROSS-REFERENCES TO RELATED APPLICATION

This application claims priority to U.S. Provisional Application Ser. No. 60/590,220, filed Jul. 22, 2004, which is incorporated herein by reference.

FIELD OF THE INVENTION

The present invention relates to a patch panel for interconnecting communication cables and, more particularly, to a patch panel assembly that provides full access from the front of the patch panel for punch down terminations.

BACKGROUND OF THE INVENTION

In equipment rack systems used to distribute communication cables, it is necessary to provide access to the various connections for the removal or installation of the cables. The installer often encounters difficulties when removing or installing the cables because of the lack of access to the connections. If the connections are only accessible in the back of the equipment rack system, the installer may not have sufficient room to access the connections. Equipment rack systems have been designed with a drawer having a front panel that rotates to provide access to the communication connections from the front of the rack. Access from the front of the rack, however, may still be restricted by panels and cables positioned above or below the drawer in the equipment rack system. As a result, there is still a need for full unobstructed front access to the communication connections mounted within the equipment rack systems.

SUMMARY OF THE INVENTION

The patch panel assembly includes a drawer and a patch panel pivotally mounted to the drawer. The drawer has a pair of sidewalls and a cable tray positioned therebetween. The cable tray has a plurality of slide locks including lock releases that allow the cable tray to move between a closed position and an open position with respect to the sidewalls. The cable tray also has a plurality of retainer clips that allow the patch panel to move between an upright position and a rotated position with respect to the cable tray.

Preferably, each sidewall includes a mounting bracket having a plurality of apertures for mounting the sidewalls to an equipment rack or frame. Moreover, each sidewall includes a plurality of slots for receiving a cable tie to secure a bundle of cables to the sidewalls.

Preferably, the front portion of the cable tray is flush with the sidewall mounting bracket in the closed position, and the front portion of the cable tray is extended in front of the sidewall mounting bracket in the open position.

Preferably, each side of the cable tray includes a pivot pin and each side of the patch panel includes an aperture for receiving the pivot pin. Moreover, each side of the patch panel includes a first aperture and a second aperture. The patch panel is flush with the front portion of the cable tray in the upright position, and the patch panel is rotated about 135 degrees with respect to the cable tray in the rotated position.

Preferably, each retainer clip includes a handle having a first end affixed to the outer surface of the side of the cable tray and a second end opposite the first end. The second end includes a knob extending toward the cable tray and at least one finger extending outwardly at an angle away from the cable tray.

BRIEF DESCRIPTION OF FIGURES

The features and advantages of this invention will become apparent from the following description of preferred embodiments with reference to the accompanying drawings, wherein.

DETAILED DESCRIPTION OF PREFERRED EMBODIMENTS

Figure 1:
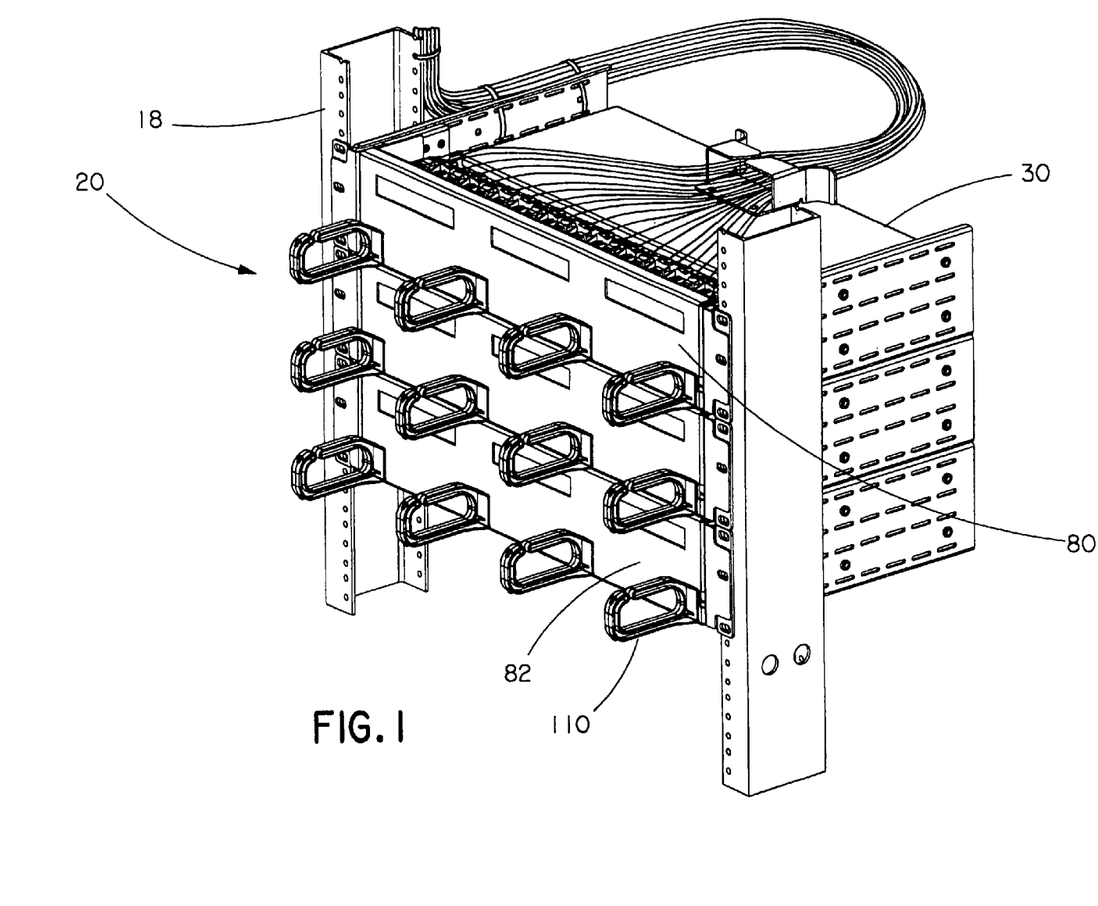
FIG. 1 is a front perspective view of the punch down patch panel assembly of the present invention mounted to an equipment rack.
Figure 2:
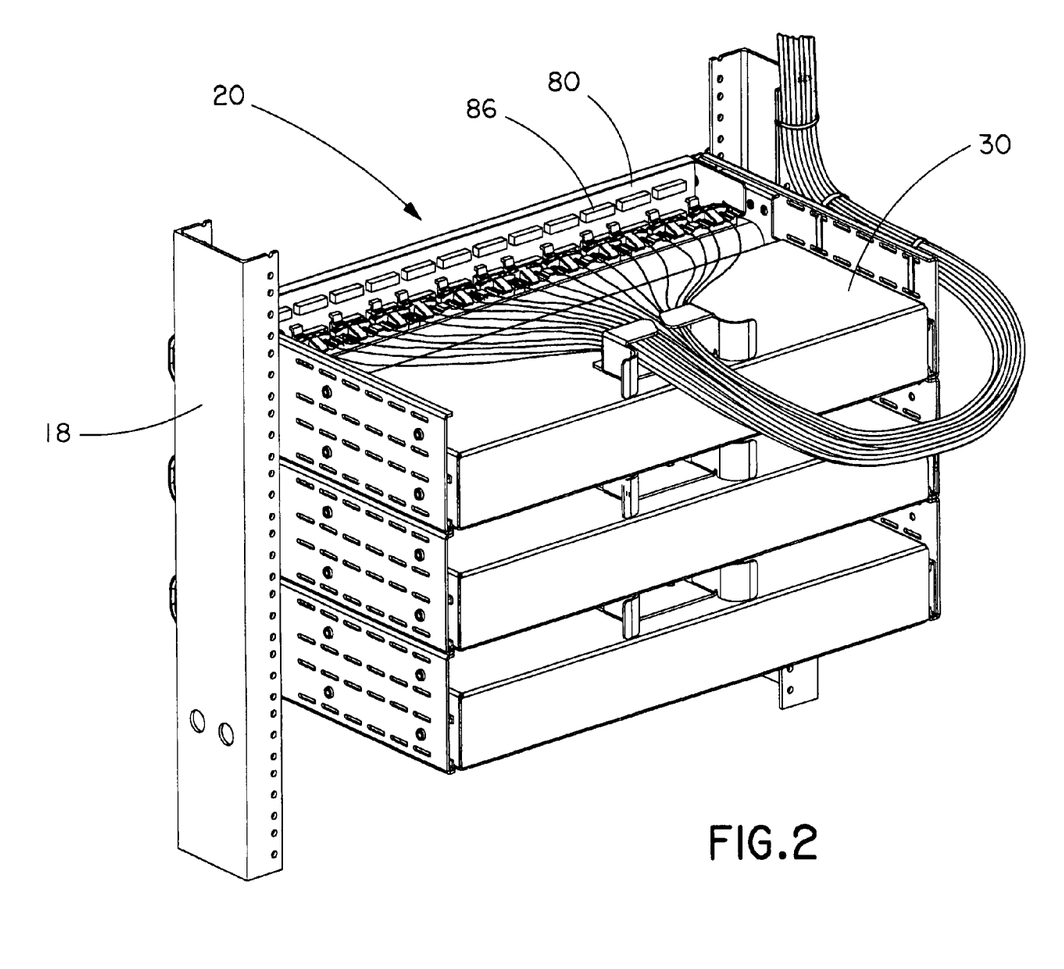
FIG. 2 is a rear perspective view of the punch down patch panel assembly of FIG. 1.

FIGS. 1 and 2 illustrate a plurality of punch down patch panel assemblies 20 of the present invention mounted to an equipment rack 18 or frame. The patch panel assemblies 20 may also be mounted in an equipment cabinet. Each patch panel assembly 20 has a plurality of cables that are connected to the patch panel 80 and routed along the equipment rack 18.

The patch panel assembly 20 includes a sliding drawer 30 with a patch panel 80 pivotally mounted to the drawer. The patch panel 80 includes a plurality of D-shaped cable management rings 110 attached to the front surface 82 of the patch panel 80. The patch panel 80 includes a plurality of modular jacks accessible from the front of the patch panel and a plurality of punch down connector blocks 86 accessible from the back of the patch panel.

Figure 3:
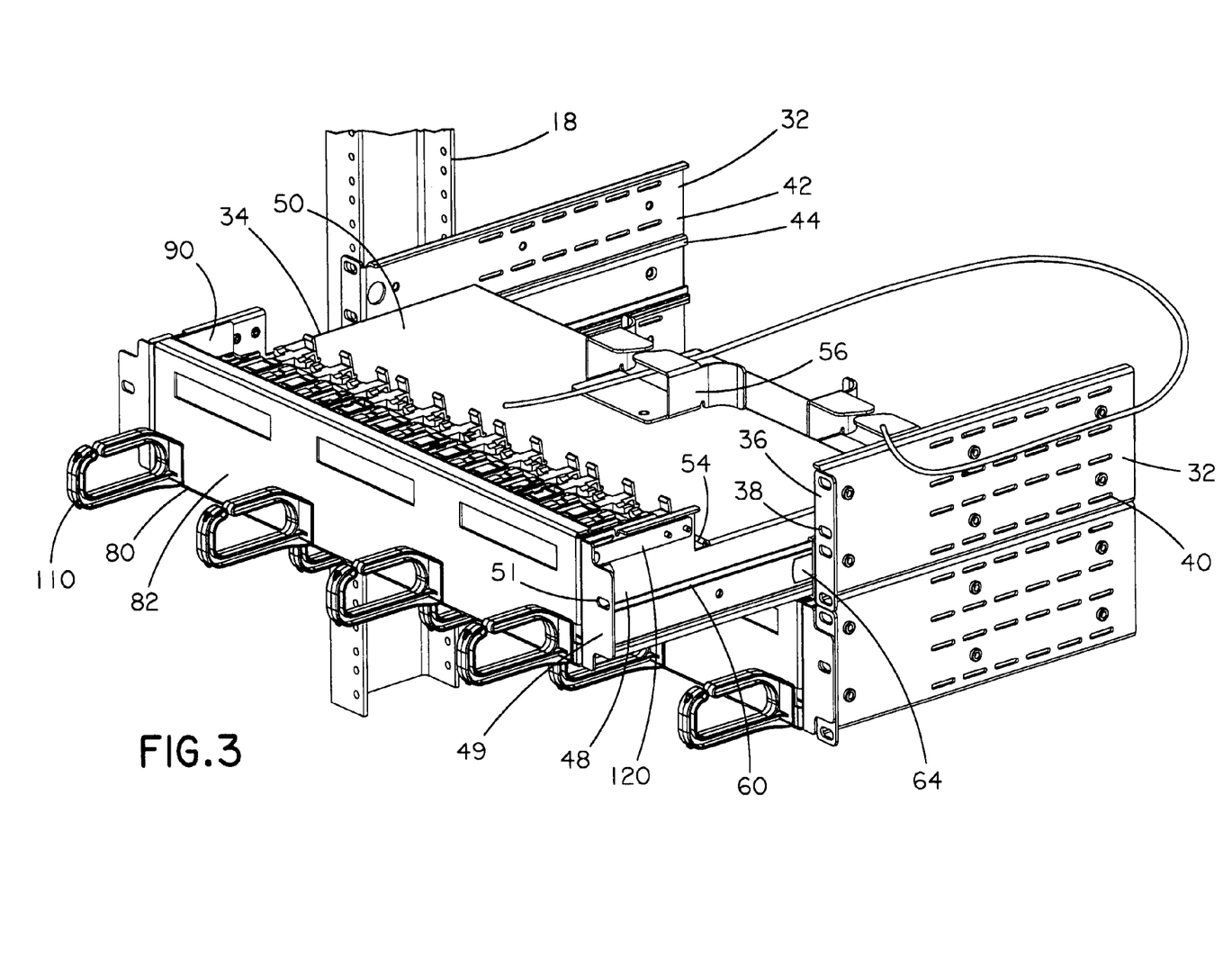
FIG. 3 is a front perspective view of the punch down patch panel assembly of FIG. 1, with the patch panel assembly pulled forward to a position in front of the rack and a cable being routed towards the patch panel.

As shown in FIG. 3, the sliding drawer 30 includes a pair of identical sidewalls 32 and a cable tray 34. Each sidewall 32 includes a mounting bracket 36 with a plurality of holes 38 for mounting the sidewalls 32 to the equipment rack 18. The sidewalls 32 also include a plurality of slots 40 for receiving a cable tie or the like to secure a bundle of cables to the sidewalls as the cables are routed towards the equipment rack. Each sidewall 32 includes a track 44 located on the inner surface 42 of the sidewalls 32. The tracks 44 are positioned along the bottom half of the sidewalls 32 such that the tracks 44 extend the length of the sidewalls.

The cable tray 34 includes two sides 48, a front portion 49, a top portion 50 and a back portion 52. The front portion 49 has at least one mounting hole 51. The cable tray 34 also has an open area 54 that is defined by the sides 48 and the top portion 50. The open area 54 accommodates the patch panel 80 that is mounted to the cable tray to form the front of the drawer.

A cable retaining ring 56 extends upwardly from the top portion 50 of the cable tray 34. As shown in FIGS. 1 and 2, the cable retaining ring 56 houses the cables routed from the patch panel to the equipment rack. The outer surface 58 of the sides 48 of the cable tray 34 includes tracks 60 that slidingly engage the tracks 44 on the inner surface of the sidewalls 32 of the drawer. Alternatively, the sides of the cable tray or the sides of the drawer may also include a roller to facilitate sliding the cable tray with respect to the drawer sides.

Figure 4:
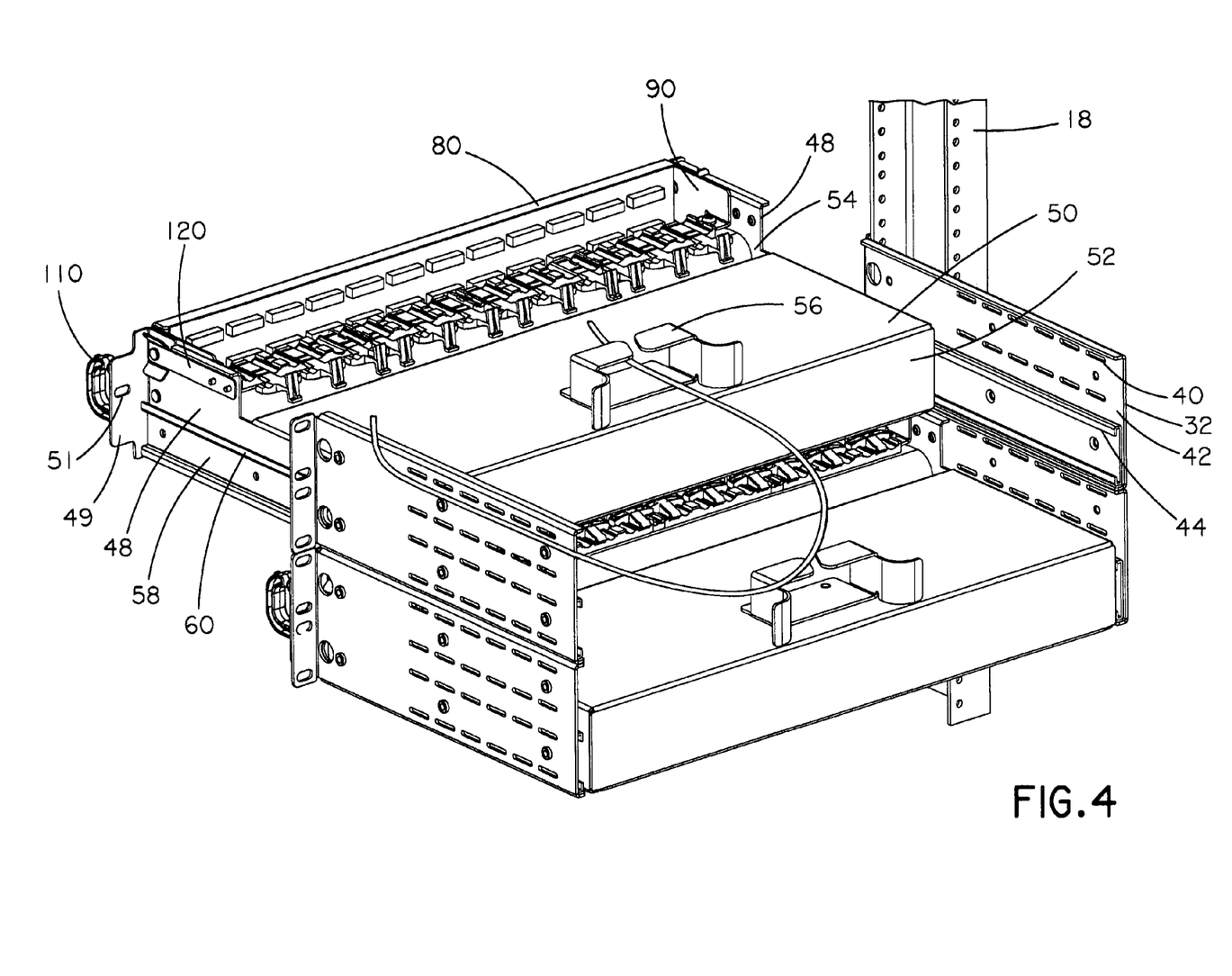
FIG. 4 is a rear perspective view of the punch down patch panel assembly of FIG. 1, with the patch panel assembly pulled forward to a position in front of the rack and a cable being routed towards the patch panel.
Figure 5:
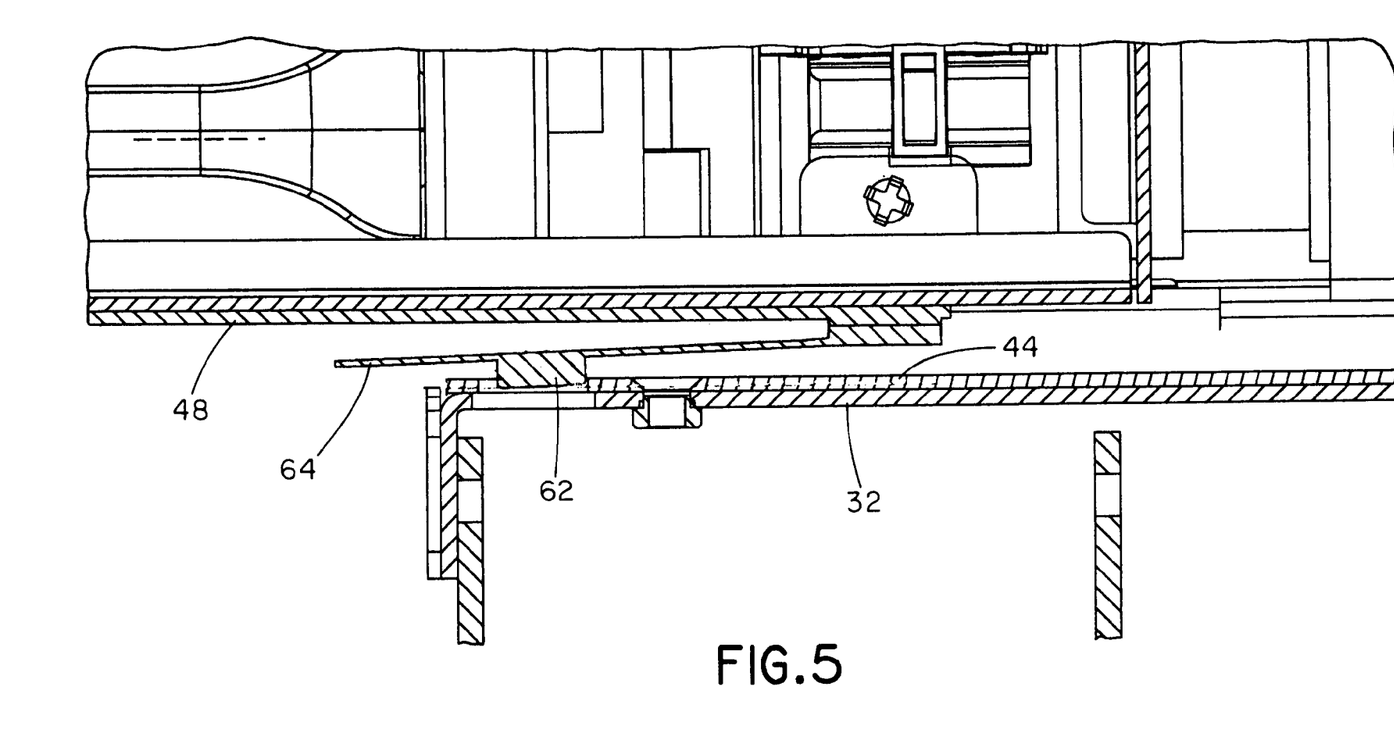
FIG. 5 is a cross-sectional view of the drawer and the drawer slide lock taken along line 5-5 of FIG. 3.

As shown in FIG. 5, a drawer slide lock 62 with a lock release 64 is located on each side 48 of the cable tray 34. The drawer slide locks 62 enable the cable tray 34 to be locked in a pulled out or open position with respect to the sidewalls 32. For example, as shown in FIGS. 3 and 4, the drawer slide locks 62 enable the cable tray 34 to be fully extended in front of the equipment rack. As shown in FIG. 5, the drawer slide locks 62 engage a hole or opening in each sidewall 32 to maintain the cable tray in a stationary or locked position. To move the cable tray, the lock release 64 of each drawer slide lock 62 is engaged and biased towards the cable tray 34 thereby removing the drawer slide locks 62 from the openings in the sidewalls 32. Once the drawer slide locks have been removed from the openings, the cable tray 34 may be slid along the track back to a closed position where the patch panel is flush with the equipment rack. Locking knobs or similar fasteners may be inserted in the mounting holes 51 of the cable tray front portion 49 to secure the cable tray and the patch panel to the equipment rack.

Figure 6:
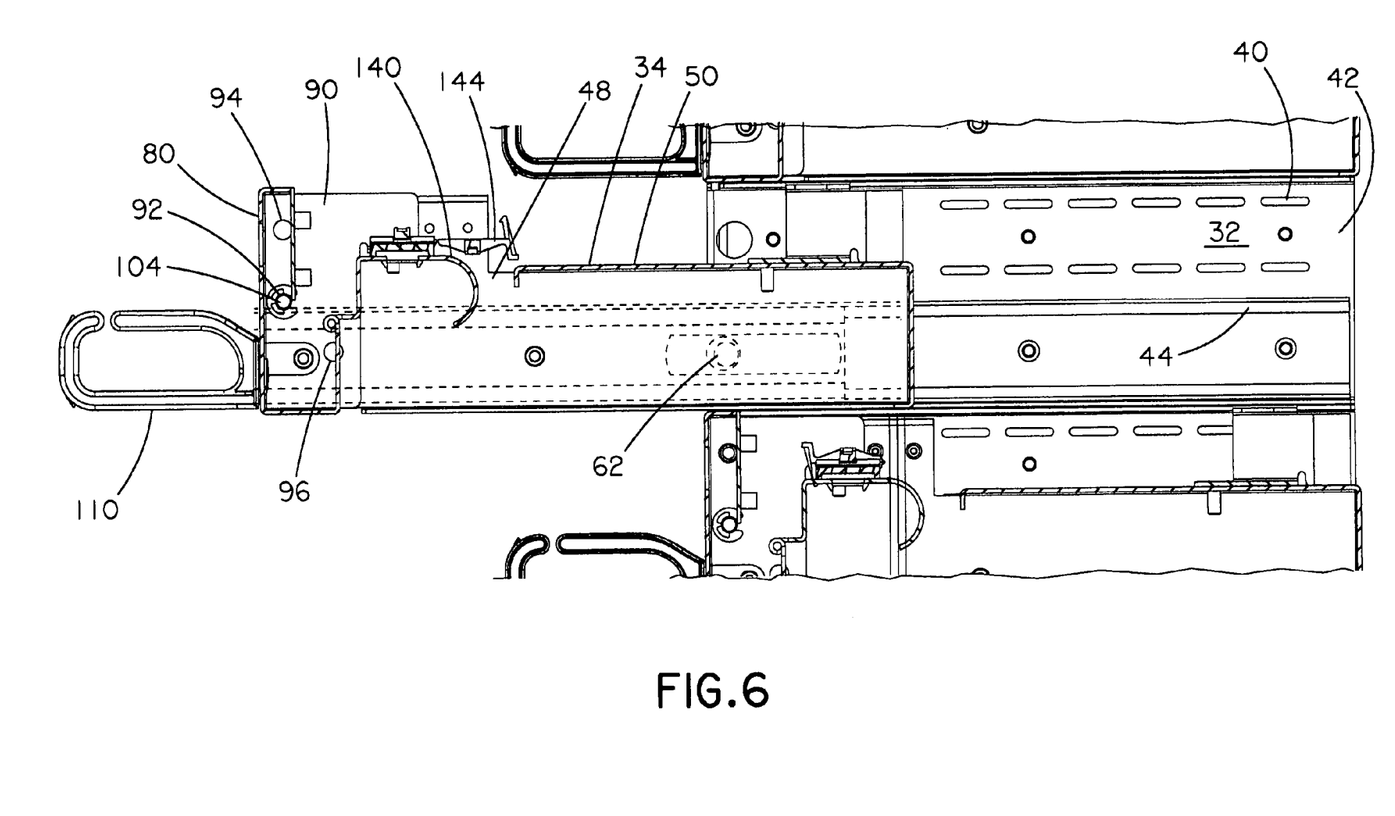
FIG. 6 is side view of the patch panel assembly of FIG. 1, with the patch panel assembly pulled forward to a position in front of the rack and a cable being routed towards the patch panel.

As discussed above, the patch panel 80 is pivotally mounted to the sides 48 of the cable tray 34 to form the front of the drawer. FIG. 6 illustrates the sides 90 of the patch panel 80 with a hole 92 or opening for receiving a pivot pin 104 that extends through each side of the cable tray. As will be discussed with respect to FIGS. 8-13, the patch panel 80 rotates about the pivot pin 104 with respect to the cable tray. The sides 90 of the patch panel 80 also include an upper detent hole 94 or opening and a lower detent hole 96 or opening for enabling the patch panel to be locked in an upright or a rotated position.

Figure 7:
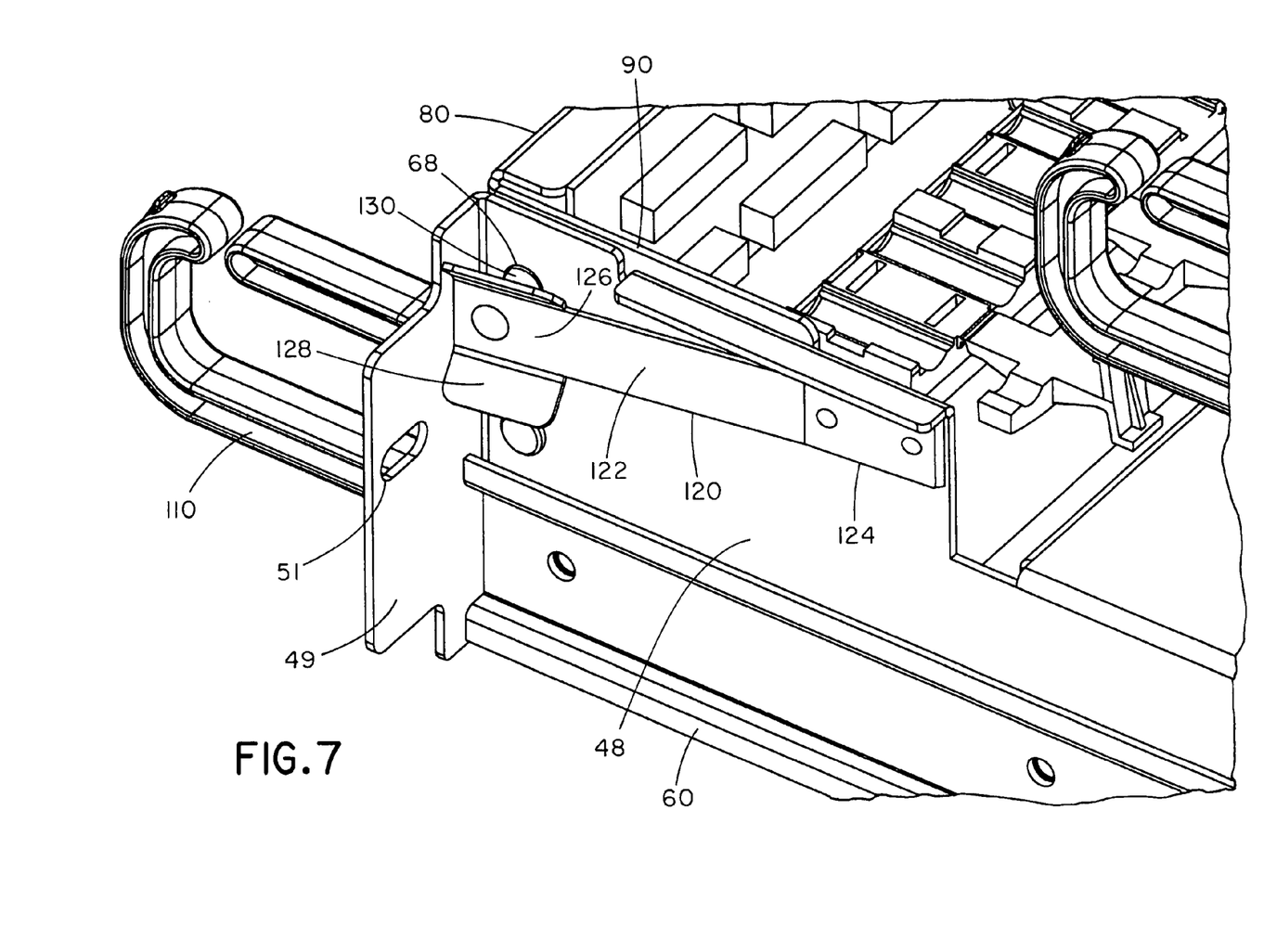
FIG. 7 is a rear perspective view of the patch panel retainer clip being disengaged from the patch panel of the patch panel assembly of FIG. 1.

The patch panel 80 is locked in an upright position or a rotated position by patch panel retainer clips 120 that engage each side of the patch panel. As shown in FIG. 7, each patch panel retainer clip 120 includes a handle 122 with a first end 124 affixed to the outer surface 58 of the side 48 of the cable tray 34. The second end 126 of the patch panel retainer clip 120 has a knob 130 extending towards the cable tray and fingers 128 extending outwardly at an angle away from the cable tray. The patch panel retainer clips 120 are positioned so that the knobs 130 can be disposed within a hole in the side 48 of the cable tray when it is aligned with the upper detent hole 94 or lower detent hole 96 located in each side 90 of the patch panel 80. To release the patch panel retainer clips, the installer would engage the fingers to bias the retainer clips away from the cable tray thereby removing the knobs 130 from the detent holes. Once the knobs 130 are removed from the detent holes, the patch panel may be rotated.

Figure 8:
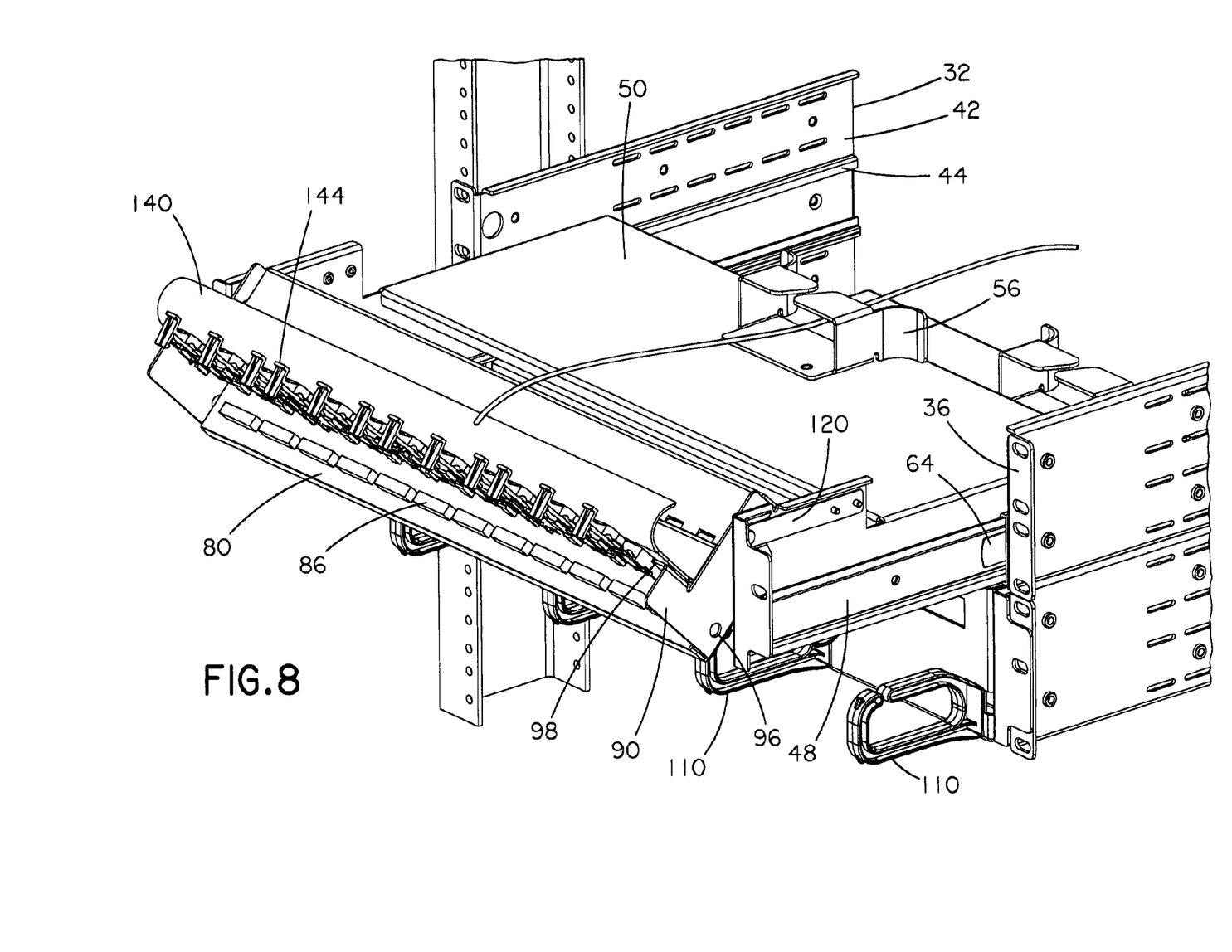
FIG. 8 is a front perspective view of the patch panel assembly of FIG. 3, with the patch panel rotated with respect to the drawer.
Figure 9:
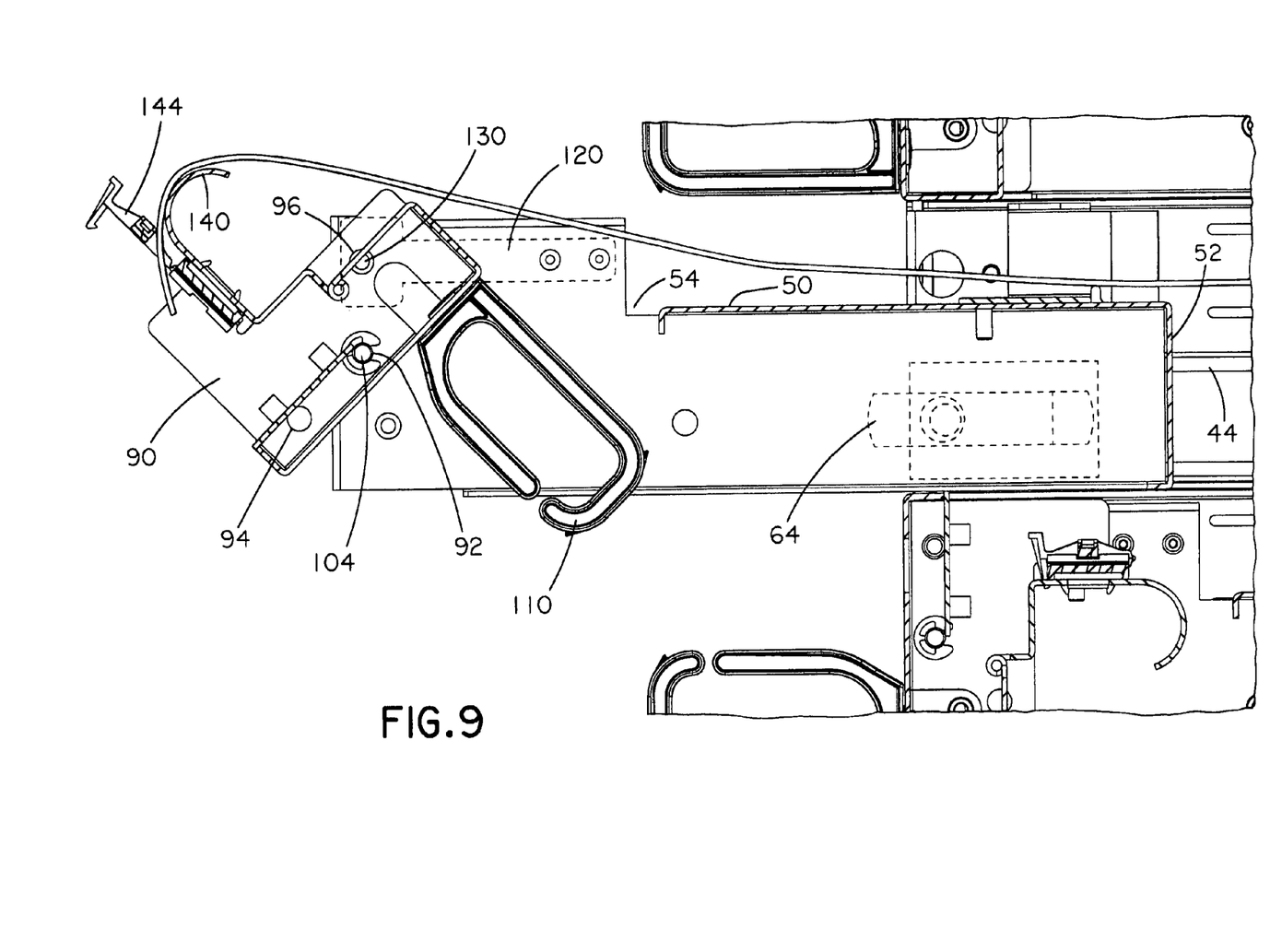
FIG. 9 is a side view of the patch panel assembly of FIG. 8, with the patch panel being rotated with respect to the drawer.

FIGS. 8-13 illustrate the patch panel 80 rotated downwardly about the pivot pin 104 to provide access to the punch down connector blocks 86. As shown in FIGS. 8 and 9, the patch panel 80 is rotated until the lower detent holes 96 become aligned with the holes in the side 48 of the cable tray 34. Once the holes become aligned, the knobs 130 of the patch panel retainer clips 120 are positioned to extend through the aligned holes to lock the patch panel 80 in the rotated position. Preferably, the patch panel 80 rotates approximately 135 degrees with respect to the cable tray 34 to provide full front access to the punch down connector blocks 86. Thus, the full front access to the punch down connector blocks facilitates connecting the cables to the system.

FIG. 9 also illustrates the pivot pin 104 that is disposed in the sides of the cable tray and in the pivot holes 92 in the sides 90 of the patch panels 80. A washer may be placed around the pivot pin 104 to retain the pivot pin when the patch panel 80 rotates about the pivot pin 104.

Alternatively, the patch panel may rotate about the cable tray by a cam mechanism. Each side of the patch panel may include a roller that travels along a track to allow the patch panel to rotate from an upright position to a rotated front access position. The drawer sides may include various cam members, such as a front cam, a rear cam and a center cam, that would guide the rollers as the patch panel rotates from the upright position to the rotated position. As the patch panel is pulled forward along the track and cam members, the patch panel will automatically rotate to the front access position.

The patch panel assembly includes a strain relief bar 140 that is secured to flanges 98 that extend inwardly from the sides 90 of the patch panel 80. The strain relief bar 140 is preferably retained on the patch panel flanges 98 by a quick release fastener, such as a pin that is disposed in a locking hole. The quick release fastener is retained on the patch panel when the strain relief bar is unlocked. The strain relief bar 140 transitions the cables from the patch panel towards the equipment rack. The patch panel assembly also includes strain relief cable clamps 144 that are located on the strain relief bar. The strain relief cable clamps support and guide the cables. The strain relief cable clamps also alleviate the stress on the cables.

Figure 10:
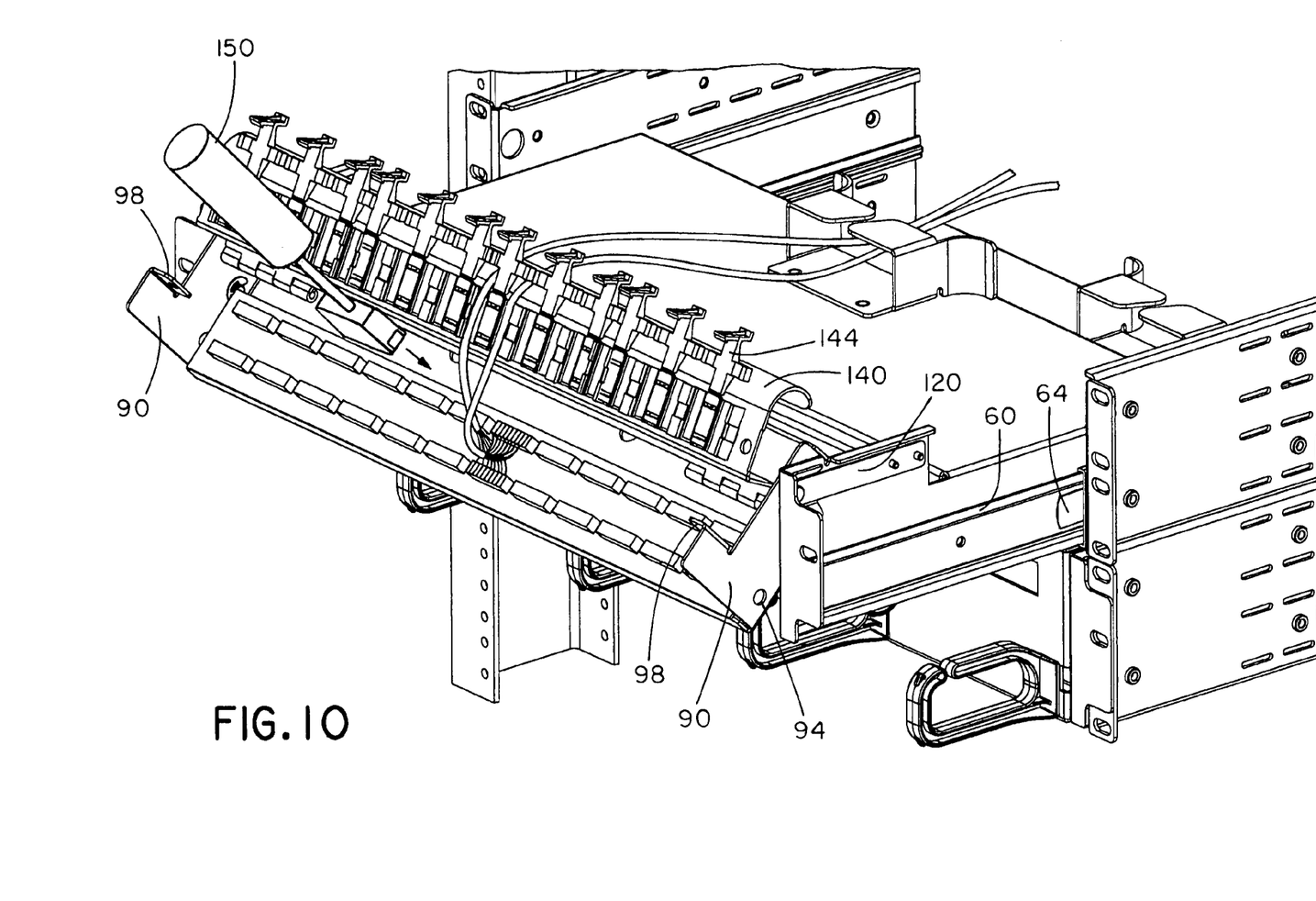
FIG. 10 is a front perspective view of the patch panel assembly of FIG. 8, with the strain relief bar rotated away from the patch panel.
Figure 11:
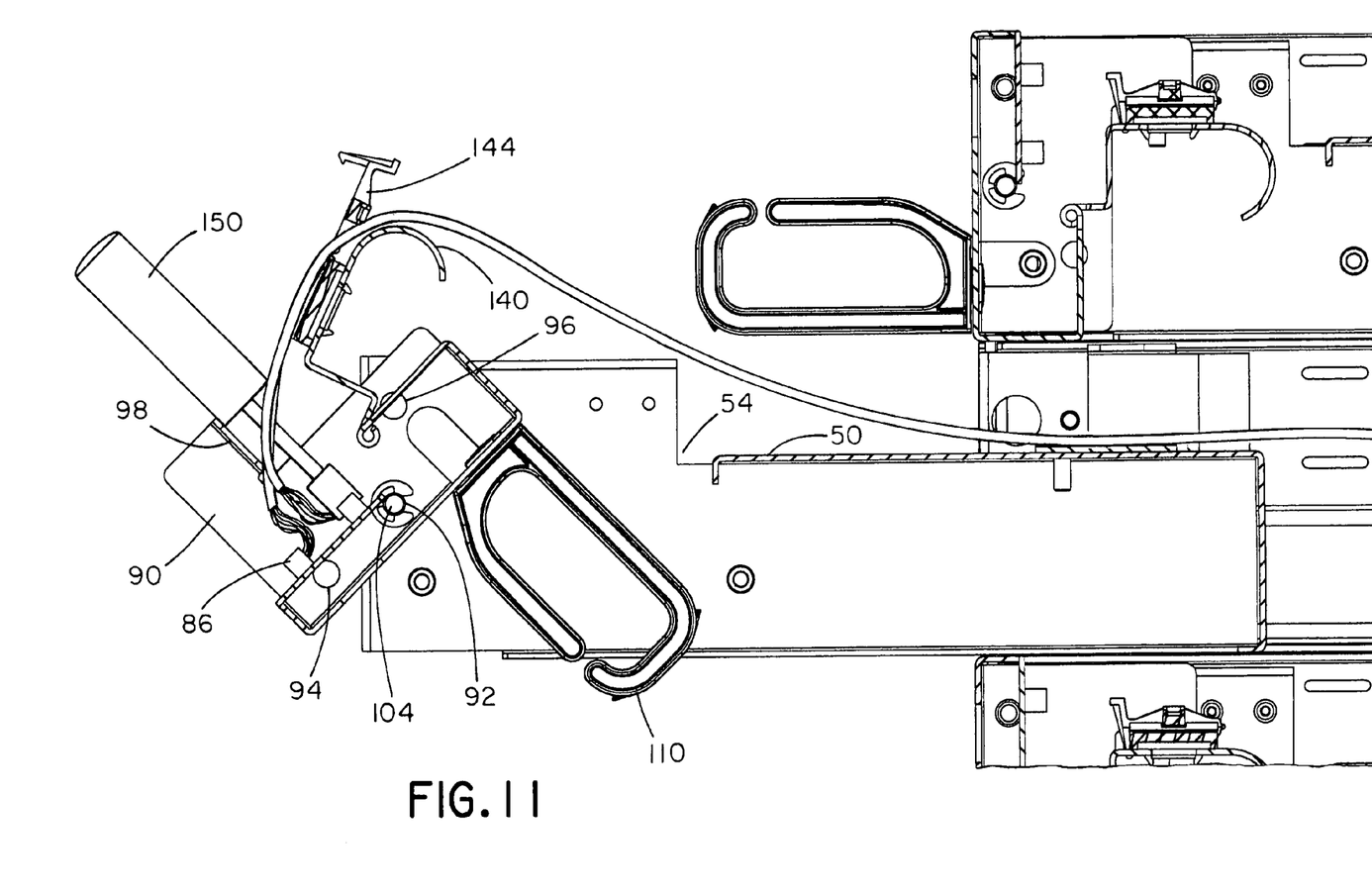
FIG. 11 is a side view of the patch panel assembly of FIG. 10, with the strain relief bar rotated away from the patch panel.
Figure 12:
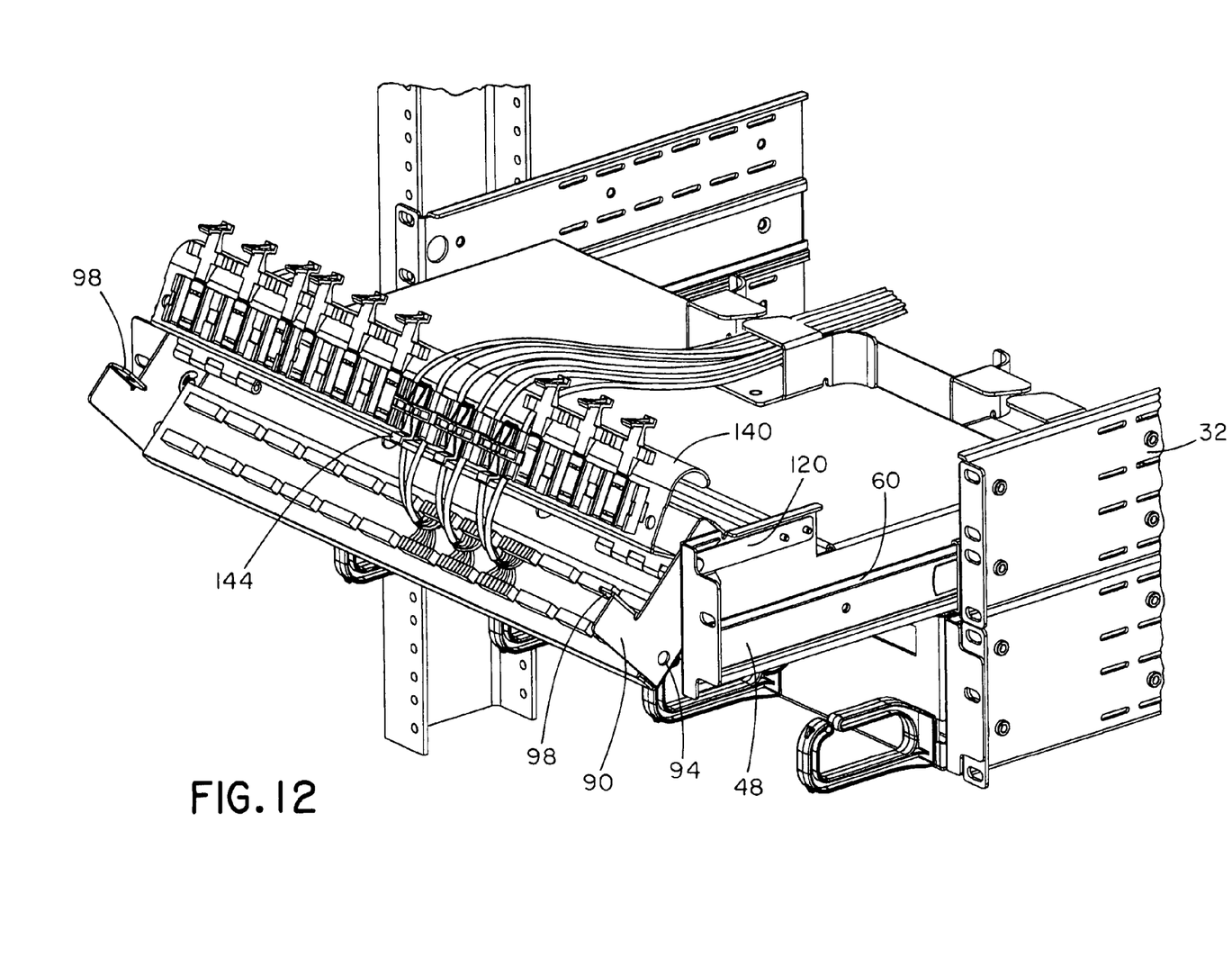
FIG. 12 is a front perspective view of the patch panel assembly of FIG. 8, with the strain relief bar rotated away from the patch panel and the strain relief clip retaining punched down cables.

As shown in FIGS. 10 and 11, the strain relief bar 140 has been disengaged from the flanges 98 and has been rotated 90 degrees upwards away from the patch panel. After the strain relief bar 140 has been rotated from the patch panel, the punch down connector blocks 86 are fully accessible from the front of the equipment rack. As a result, as shown in FIG. 11, the cables may easily be connected to the punch down connector blocks 86 by a punch down tool 150.

Figure 13:
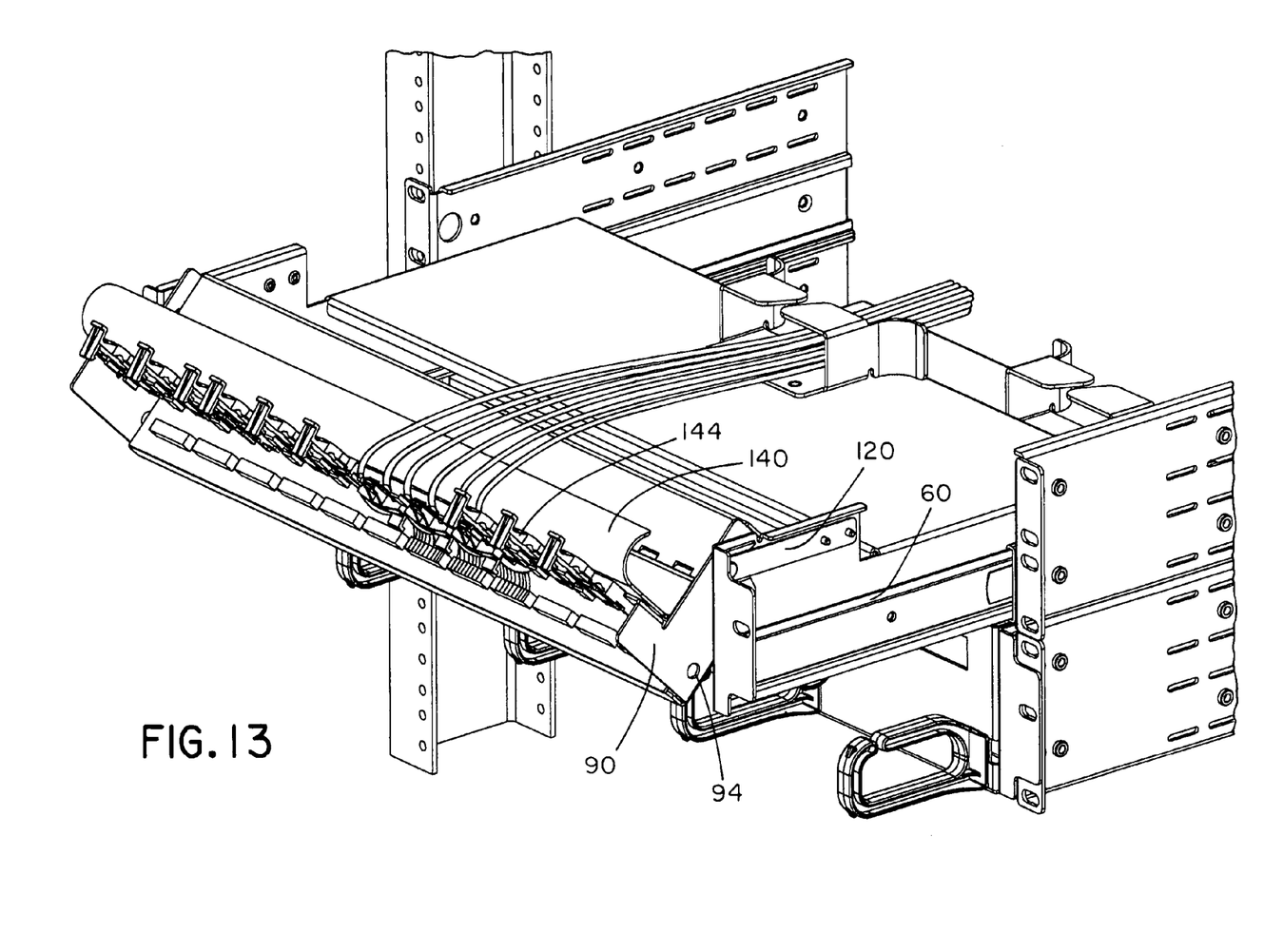
FIG. 13 is a front perspective view of the patch panel assembly of FIG. 8, with the strain relief bar rotated to the locked position and the strain relief clip retaining punched down cables.

After the cables have been connected to the patch panel 80, the strain relief cable clamps 144 are closed (FIG. 12) and the strain relief bar 140 is rotated back to an upright position (FIG. 13). The quick release fastener engages the strain relief bar 140 to lock the strain relief bar in an upright position.

After the cables are connected, removed or replaced, the patch panel 80 may be rotated back to the upright position. First, the fingers 128 of the patch panel retainer clips 120 are engaged to remove the knobs 130 from the lower detent holes 96 in the sides 90 of the patch panel 80. The patch panel 80 may then be rotated upwards until the upper detent holes 94 are aligned with the holes 48 of the cable tray 34. Next, the knobs 130 of the patch panel retainer clips 120 are positioned to extend through the aligned holes to lock the patch panel 80 in the upright position. Once the knobs 130 have locked the patch panel in the upright position, the lock release 64 is engaged and biased towards the cable tray 34 so that the drawer sliding lock 62 can be removed from the opening in the sidewall. The cable tray 34 can now be slid along the track into the equipment rack 18 until the patch panel is flush with the rack. Locking knobs or similar fasteners may be inserted in the mounting holes 51 of the cable tray front portion 49 to secure the cable tray and the patch panel to the equipment rack.

The patch panel assembly of the present invention may also be designed to accommodate an angled patch panel. The system would enable an angled patch panel to be mounted to a cable tray. Once the cable tray is fully extended from the equipment rack, the angled patch panel may be rotated to provide front access to the connector blocks.

The pull out rotating punch down patch panel assembly of the present invention allows full access to cables from the front of the equipment rack, frame or cabinet. This allows an installer to terminate cables on the patch panel without interfering with the cable connections on existing panels or equipment located above or below the patch panel assembly.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A patch panel assembly comprising:
a drawer having a front, a rear and a pair of sidewalls and a cable tray positioned therebetween, the cable tray having a plurality of slide locks including lock releases that allow the cable tray to move between a closed position and an open position with respect to the sidewalls; and
a patch panel pivotally mounted to the drawer.

2. The patch panel assembly of claim 1, wherein each sidewall includes a mounting bracket having a plurality of apertures for mounting the sidewalls to an equipment rack or frame.

3. The patch panel assembly of claim 2, wherein a front portion of the cable tray is flush with the mounting bracket in the closed position.

4. The patch panel assembly of claim 2, wherein a front portion of the cable tray is extended in front of the mounting bracket in the open position.

5. The patch panel assembly of claim 1, wherein each sidewall includes a plurality of slots for receiving a cable tie to secure a bundle of cables to the sidewalls.

6. The patch panel assembly of claim 1, wherein the cable tray has a top portion including a cable retaining ring affixed thereon.

7. The patch panel assembly of claim 1, wherein the patch panel has a front surface including a plurality of cable management rings attached thereto.

8. The patch panel assembly of claim 1, wherein the patch panel includes a plurality of modular jacks and a plurality of punch down connector blocks.

9. The patch panel assembly of claim 1, wherein the patch panel is a punch down patch panel.

10. The patch panel assembly of claim 1, further comprising a plurality of cables connected to the patch panel.

11. The patch panel assembly of claim 1, further comprising a strain relief bar releasably secured to the patch panel, the strain relief bar having a plurality of cable clamps and being capable of rotating 90 degrees with respect to the patch panel.

12. A patch panel assembly comprising:
a drawer having a front, a rear and a pair of sidewalls and a cable tray positioned therebetween; and
a patch panel pivotally mounted to the drawer,
wherein the cable tray has a plurality of retainer clips that allow the patch panel to move between an upright position and a rotated position with respect to the cable tray.

13. The patch panel assembly of claim 12, wherein the patch panel is flush with a front portion of the cable tray in the upright position.

14. The patch panel assembly of claim 12, wherein the patch panel is rotated about 135 degrees with respect to the cable tray in the rotated position.

15. The patch panel assembly of claim 12, wherein each side of the cable tray includes a pivot pin and each side of the patch panel includes an aperture for receiving the pivot pin.

16. The patch panel assembly of claim 12, wherein each side of the patch panel includes a first aperture and a second aperture.

17. The patch panel assembly of claim 12, wherein each retainer clip includes a handle having a first end affixed to an outer surface of a side of the cable tray and a second end opposite the first end.

18. The patch panel assembly of claim 17, wherein the second end includes a knob extending toward the cable tray and at least one finger extending outwardly at an angle away from the cable tray.

19. A patch panel assembly comprising:
a drawer having a front, a rear and a pair of sidewalls and a cable tray positioned therebetween, the cable tray having a plurality of slide locks including lock releases that allow the cable tray to move between a closed position and an open position with respect to the sidewalls; and
a patch panel pivotally mounted to the drawer,
wherein the cable tray has a plurality of retainer clips that allow the patch panel to move between an upright position and a rotated position with respect to the cable tray.

* * * * *